CORD TYPE CONTAINER CARRIER

Original Filed Dec. 27, 1967 3 Sheets-Sheet 1

CORD TYPE CONTAINER CARRIER

Original Filed Dec. 27, 1967 3 Sheets-Sheet 2

CORD TYPE CONTAINER CARRIER

Original Filed Dec. 27, 1967 3 Sheets-Sheet 3

United States Patent Office

Re. 27,705
Reissued July 24, 1973

27,705
CORD TYPE CONTAINER CARRIER

James D. Rockett, Eagle, Wis., assignor to Illinois Tool Works, Inc., Chicago, Ill.

Original No. 3,480,135, dated Nov. 25, 1969, Ser. No. 693,856, Dec. 27, 1967. Application for reissue July 27, 1971, Ser. No. 166,553
Int. Cl. B65d *21/02, 71/00, 85/62*
U.S. Cl. 206—65 C 13 Claims

Matter enclosed in heavy brackets [ ] appears in the original patent but forms no part of this reissue specification; matter printed in italics indicates the additions made by reissue.

ABSTRACT OF THE DISCLOSURE

A carrying unit for a plurality of containers and the like being comprised of two series of loops, each series of said loops being comprised of a cord or ribbon being wound or placed upon a series of containers to co-mate in a gripping manner, said loops being formed or welded from a single strand or a plurality of strands, embodiments being comprised of two strands per series of loops being welded, twisted and welded or otherwise joined to form complete loops, said series of said loops then being joined together to form a package unit having two parallel rows of clustered containers.

The present invention is designed to overcome the troubles and faults of prior art pertaining to container carriers. In the past most of the production of canned beverages, such as beer, was packaged, usually, in clusters of six, in paperboard cartons. Because of high costs and packaging speeds required, a substantial changeover to plastic sheet and web type container carriers has been made. The web type container carrier has made the greatest inroad into the market because of its lower cost. But, this web type carrier still has a relatively high installed cost. This relatively high cost can be attributed mainly to four factors: (1) the large amount of plastic material initially required, (2) a die cutting operation to form the desired apertures into the carrier, (3) the waste material removed by the die cutting, (4) the complicated and expensive machinery required to install the carriers on the containers.

The present invention is designed to overcome all these difficulties by the use of a continuous cord or ribbon or plurality of cords or ribbons. This method will reduce the installed costs of a container carrier by: (1) an absolute minimum of material initially required; (2) no secondary cutting operation, (3) no waste, (4) simple and inexpensive installation machinery.

The present invention is just as its name implies—a container carrier comprised entirely, in most embodiments, of a thin solid or hollow center cord or ribbon installed onto the containers and welded, for strength and rigidity, at strategic points in a continuous operation utilizing a method of producing a continuous series of loops in the cords or ribbons. The cords and ribbons are preferably made from a plastic material having at least some degree of elasticity. The continuous series of loops enclosing said containers are then severed at desired points to produce clustered containers in the desired plurralities. Removal of the clustered containers is accomplished by slipping the containers out of their loops or by tilting at least one container to break the carrier structure.

The cord type container carrier will be described with reference to the attached drawings, wherein.

Figure 1:
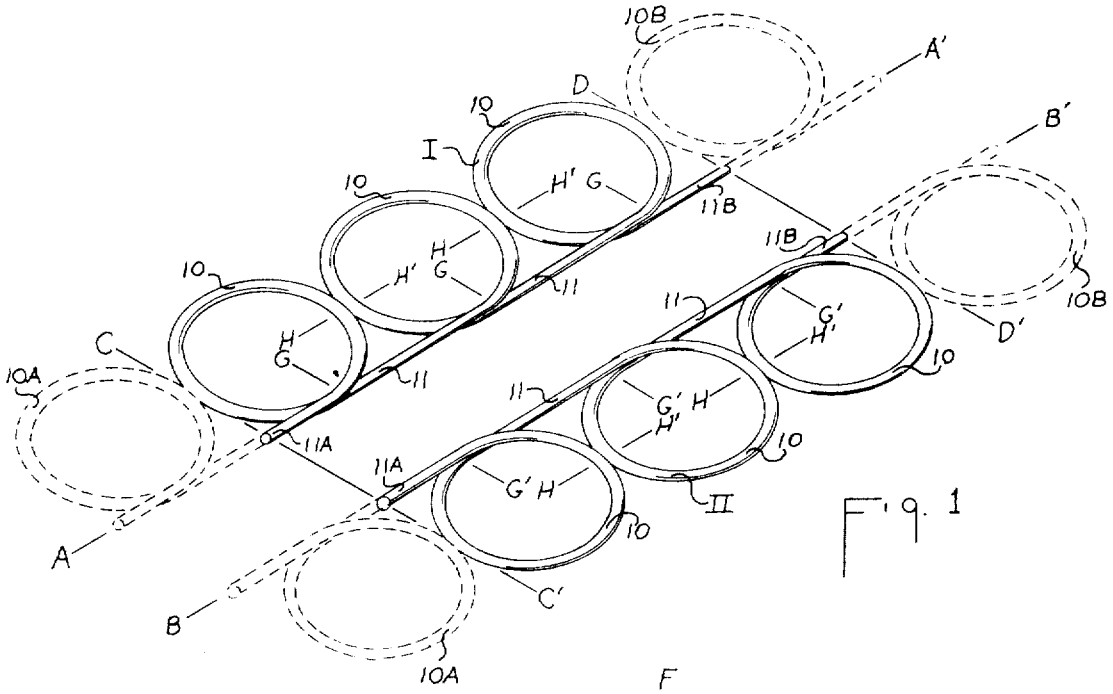
FIG. 1 is a perspective view of a cord type container carrier.

With reference to FIG. 1 a cord type container carrier is shown as a two-piece unit for a clearer understanding. One piece is designated as cord I and the other as cord II. Both are comprised of single strands of continuous plastic cords with said cords being formed into a series of continuous loops 10A, 10 and 10B with traversals 11 connecting successive loops. The loops 10A, 10 and 10B of cord I are then welded, by sufficient application of heat, to the loops 10A, 10 and 10B of cord II along planes G–G′ or cord I may be joined to cord II by welding plane A–A′ of cord I to plane B–B′ of cord II. Loops 10 of joined cords I and II may also be welded along planes H–H′ for added strength and rigidity. Welding is not done across loops 10A to 10 or from 10 to 10B as indicated by the dashed lines of loops 10A and 10B. The container carrier may then be severed, as in this case, along planes C–C′ and D–D′ by cutting traversal cords 11 and leaving traverse stubs 11A and 11B on the cluster having the desired plurality of grouped containers.

Figure 2:
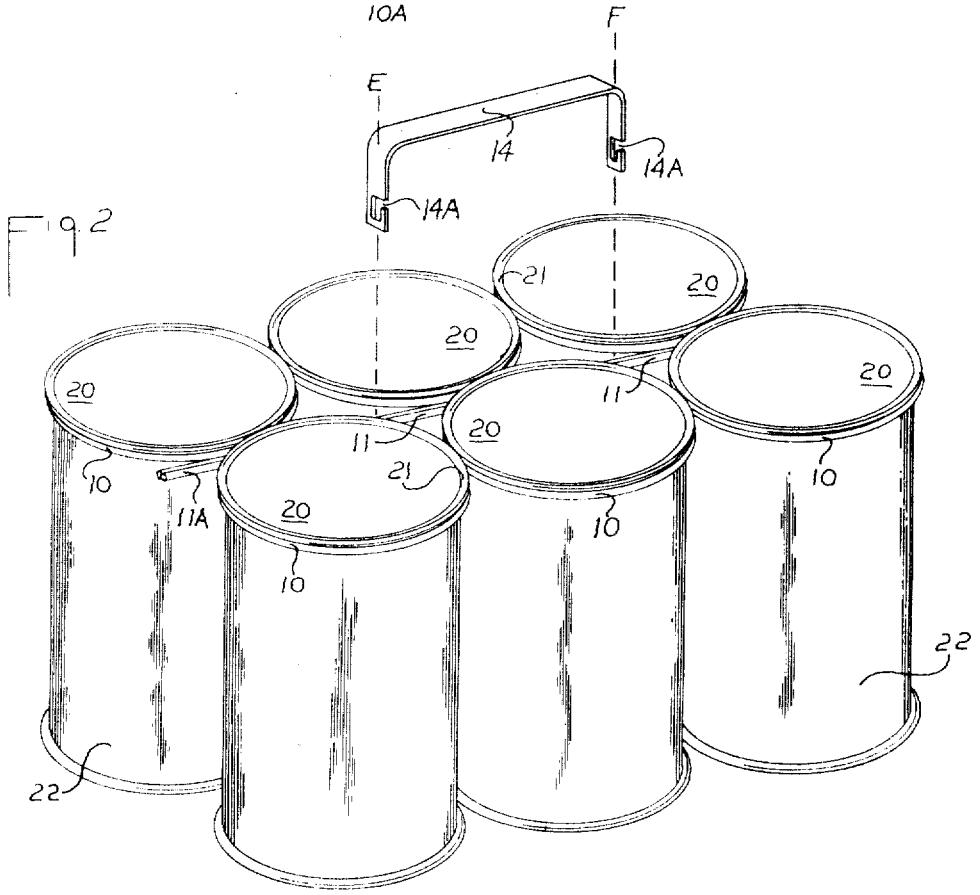
FIG. 2 is a perspective view of the container carrier of FIG. 1 installed upon a cluster of containers.

A cluster of joined containers 20, commonly known as a six-pack, is illustrated in FIG. 2 and shows the present invention installed on the said containers 20. The loops 10 encircle containers 20 below container chimes 21 along container sides 22 in a co-mating manner. Traversals 11 extend longitudinally between the two rows of containers 20 and terminate in stubs 11A at the left of the drawing and stub 11B (not shown) at the right.

A carrying handle 14 may be used with the cord type container carrier of FIGS. 1 and 2. The carrying handle 14 has slots 14A in each side member to grapple traversals 11. Carrying handle 14 is inserted along planes E and F.

Figure 3:
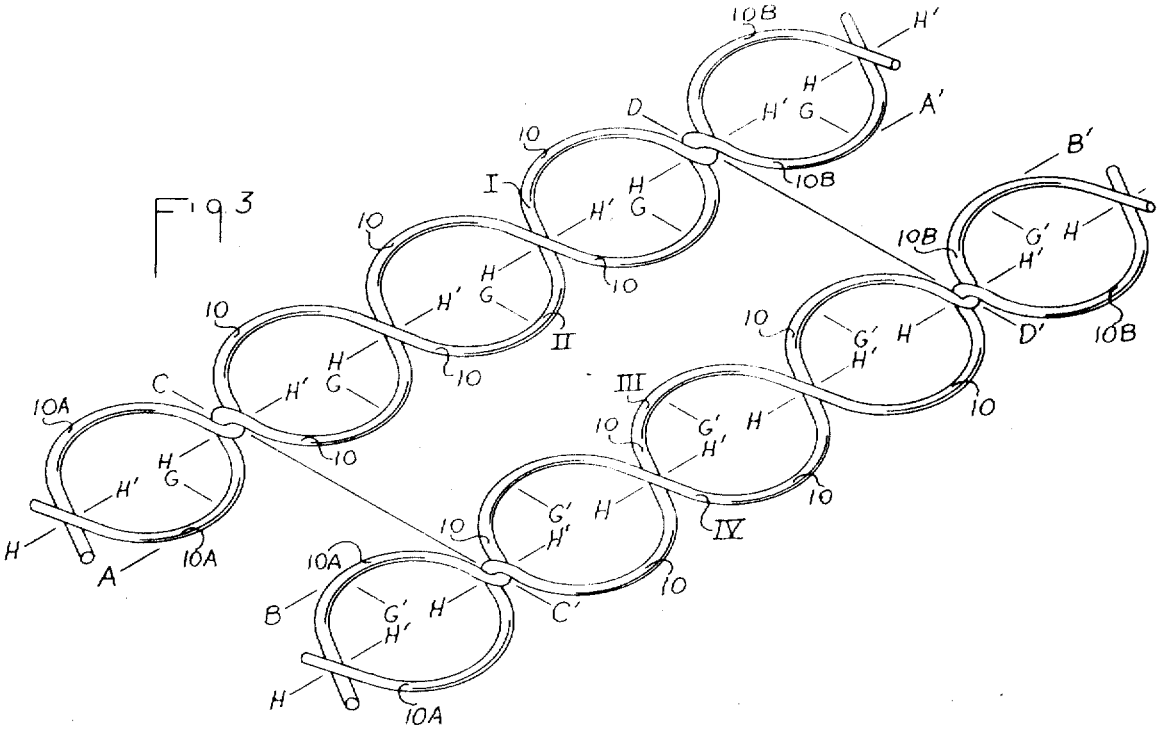
FIG. 3 is a perspective view of an embodiment of the present invention.

FIG. 3 illustrates an embodiment of the present invention in which the container carrier is constructed from four separate strands of cord. For clarity this is also shown as a two piece drawing with cords I and II forming one part and cords III andIV forming the second part. A continuous series of loops 10A, 10 and 10B of both parts is utilized as in FIGS. 1 and 2 with the difference being in the manner that the loops 10 are formed. In this embodiment two successive loops are formed by a 180° twist of the two cords comprising each part for each loop. The third twist is a 360° twist which may be made in a direction opposite to the first two twists. The first part, consisting of cord I and cord II, is then joined and welded to the second part, consisting of cord III and cord IV, along planes A–A′ and B–B′ respectively across loops 10A, 10 and 10B along planes G–G′. For rigidity, welding is also done longitudinally across loops 10A, 10 and 10B along palnes H–H′. Severance into desired clustered pluralities is done along planes C–C′ and D–D′ across the 360° twist.

Figure 4:
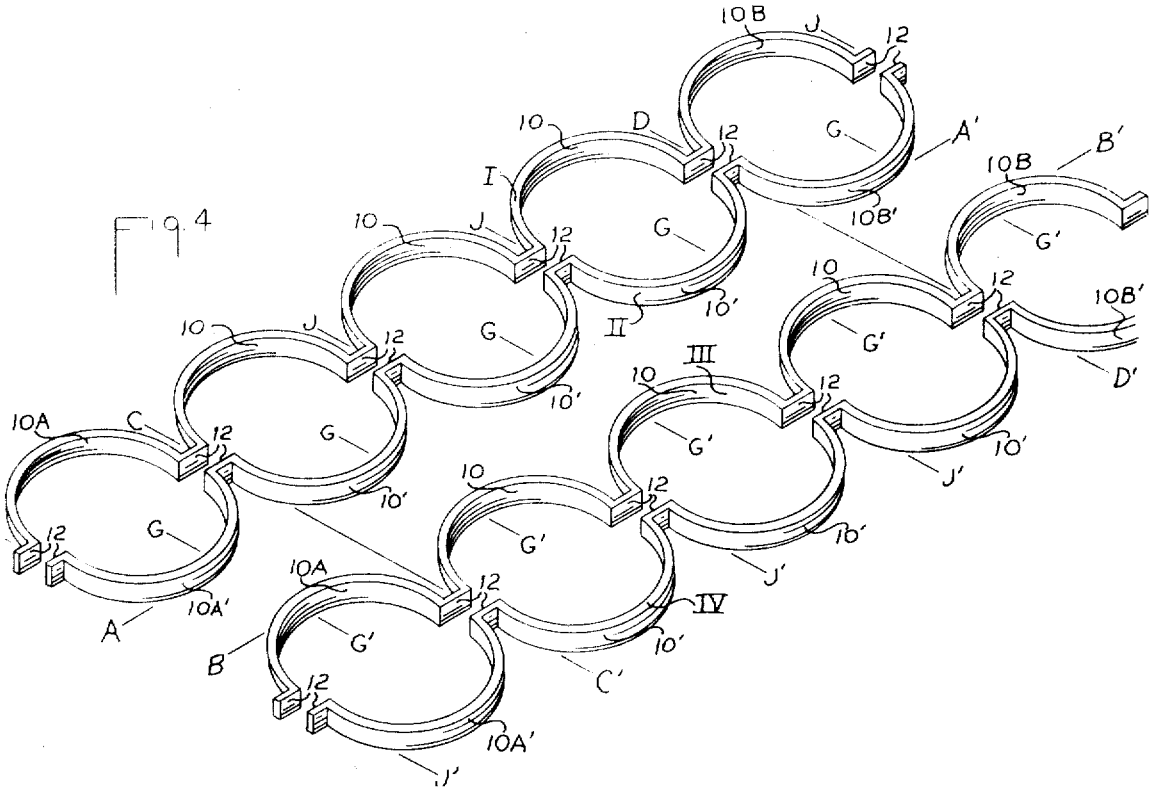
FIG. 4 is a perspective view of another embodiment utilizing ribbon.

FIG. 4 illustrates another embodiment of the present invention which is characterized by the utilization of four strands of ribbon to form the container carrier. Ribbon I and ribbon II are welded to each other by joining surface 12 of ribbon I to surface 12 of ribbon II along planes J–J′, C–C′ and D–D′. Ribbon III and ribbon IV are similarly joined and welded to each other. The first part, consisting of ribbons I and II, is then welded to the second part, consisting of ribbons III and IV, by joining planes A—A′ to plane B—B′ along planes G—G′. Severance is along planes C—C′ and D—D′. This embodiment allows a sufficiently large surface 12 for welding for greater strength of the container carrier.

Figure 5:
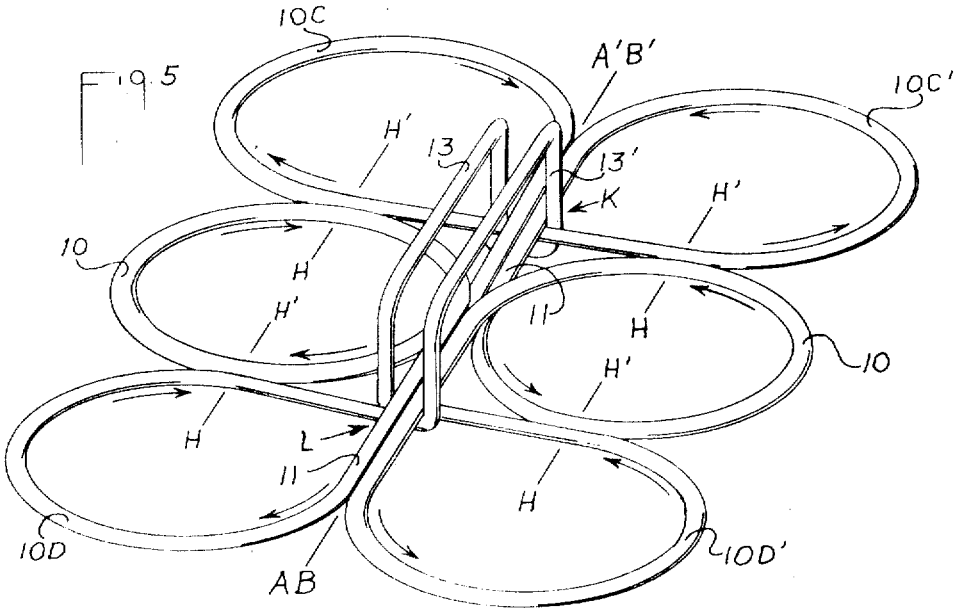
FIG. 5 is a perspective view of still another embodiment.

FIG. 5 illustrates still another embodiment of the present invention in which a single cord or ribbon is used to form the container carrier and is characterized by an integral handle. The carrier is formed commencing from the center, K, of a cord or ribbon. As shown by the arrows the two rear loops 10C and 10C′ are formed with the cords or ribbons then traversing to and forming center loops 10 and then traversing to and forming front loops 10D and 10D′ and going under traversal 11 at point L, then being turned upward and extended to above point K, there being extended downward to the rear and outside of point K to below traversal 11 where the two ends are joined. The extension of the cords or ribbons from point L to point K forms handle 13 and 13′. The carrier is then welded along planes AB—A′B′ and H—H′.

Figure 6:
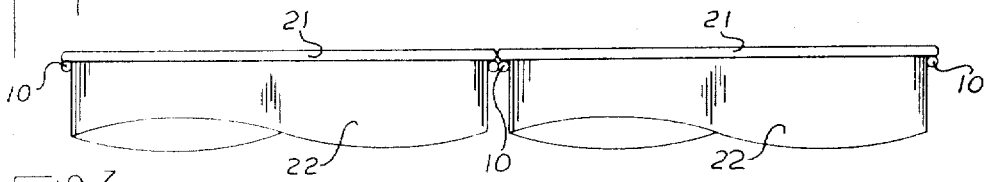
FIG. 6 is a cross sectional view showing a cord on a chimed can.

A cross sectional view of the present invention as installed on containers 20 of FIG. 2 is illustrated in FIG. 6 and is taken along planes H—H′ of FIGS. 1 and 5. As shown, the cords comprising loops 10 are of a diameter approximately equal to the distance chimes 21 extend beyond can sides 22 allowing loops 10 to contact each other for welding as shown in the center of the drawing.

Figure 7:
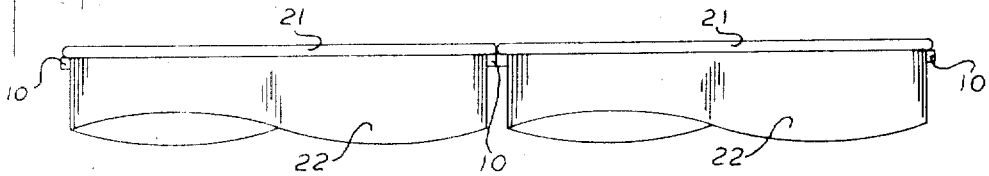
FIG. 7 is a cross sectional view showing a ribbon on a chimed can.

FIG. 7 illustrates the use of ribbon as substituted for the cord in FIG. 6.

Figure 8:
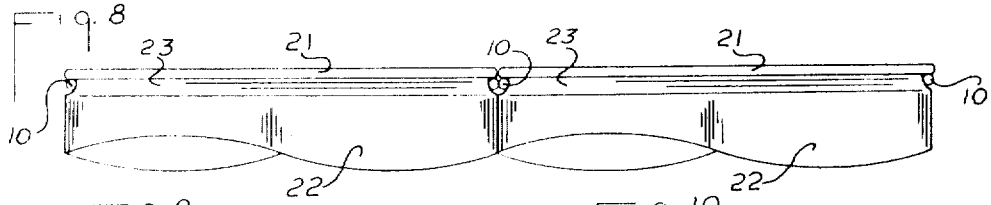
FIG. 8 is a cross sectional view showing a cord on a flush chime can.

FIG. 8 shows the use of cord loops 10 installed on the newer flush chime containers where loops 10 are in the recess 23 below chimes 21.

Figure 9:
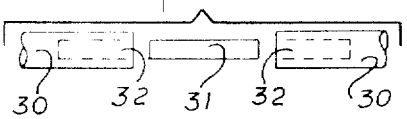
FIG. 9 is a side view showing cord connecting means.
Figure 10:
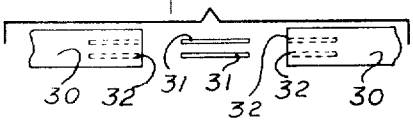
FIG. 10 is a side view showing ribbon connecting means.

FIGS. 9 and 10 show a method of connecting reels of cord or ribbon together to provide a continuous length of cord or ribbon for carrier fabrication. Cord or ribbon ends 30 have holes 32 drilled into their solid centers and the holes 32 are coated with an adhesive. Connecting plugs 31 are then inserted into cord or ribbon ends 30. Hollow center cord or ribbon is similarly connected but without the need to drill holes 32.

The present invention and all its embodiments may be formed and welded before installation, formed and welded during installation, or welded after installation.

The present invention has been shown in certain preferred embodiments but is not intended to be limited threto. Allowance is to be made to correspond with changes in the packaging industry such as, a change in pluralities of grouped containers in which two parallel rows of four are used to produce an eight-pack or three parallel rows of three to produce a nine-pack. The choice of solid center or hollow center cord or solid center or hollow center ribbon is dependent upon the weight, size and handling of the units.

I claim:

1. A container carrier for cans and the like being comprised of a plurality of continuous plastic cords, said cords being formed into continuous series of loops, said loops being placeable upon containers below the upper container chime and along said container sides in a co-mating manner with enough tension in said loops to grip said containers, said continuous series of loops encircling said containers being joined together and welded so as to effect a rigid structure, said structure being severable between certain loops to obtain secondary structures having the desired pluralities of clustered containers.

2. The container carrier of claim 1 being comprised of a plurality of continuous bands.

3. The container carrier of claim 1 being comprised of a singular continuous cord.

4. The container carrier of claim 1 being comprised of a singular continuous band.

*5. A container for a plurality of containers, said carrier formed from a resilient plastic material and having a cord-like cross-sectional shape, said material being formed into a plurality of interconnected contigouous and circumferentially continuous loops capable of individually grippingly engaging the outer circumferentially surface of one of said containers independently of the engagement of said containers by any of the other loops.*

*6. A container carrier as defined in claim 5, wherein said material is formed to be hollow.*

*7. A container carrier as defined in claim 5, and handle means for carrying a unitary package of said carrier and a plurality of containers.*

*8. A container carrier as defined in claim 5, said material further being formed to have transversal cords extending between contiguous loops.*

*9. A container carrier for a plurality of containers, said carrier formed from a resilient plastic material and having a ribbon-like cross-sectional shape, said ribbon-like material being formed into a plurality of interconnected contigouous and circumferentially continuous loops capable of individually grippingly engaging the outer circumferential surface of one of said containers, and the interconnection of said loops being formed by a welding of said ribbon-like material.*

*10. A container carrier for cans and the like being comprised of plastic cords being formed into a series of contiguous loops, said loops adapted to be placed upon complementary containers below their upper container chimes and along said container sides in a co-mating manner with enough tension in said loops to grippigly engage each of said containers, said contiguous series of loops adapted to encircle said containers being integral at selected locations so as to effect a unitary structure, wherein each of said loops operates as an isolated independent element, said structure being severable between loops to produce structures having the desired pluralities of loops which when associated with a plurality of cans produce a package of clustered containers.*

*11. A container carrier for a plurality of containers, said carrier comprising two lengths of a cord-like resilient plastic material, said two lengths of material disposed in an undulating and cooperating pattern to define a longitudinally extending series of contiguous loops, said two lengths of material being interconnected between said loops to define a longitudinally extending series of circumferentially continuous container encircling loops, and the interconnection of said loops being formed by a welding of said cord-like material.*

*12. A container carrier for a plurality of containers, said carrier comprising four lengths of a ribbon-like resilient plastic material, said four lengths of material disposed in an undulating and cooperating pattern to define two rows of longitudinally extending contiguous loops, said lengths of material being interconnected between adjacent loops to define two adjacent rows of circumferentially continuous container encircling loops, and the interconnection of said loops being formed by a welding of said ribbon-like material.*

*13. In a container carrier, said carrier being formed from a resilient plastic material and having a cord-like cross-sectional shape, said material being formed into a plurality of inter-connected contiguous and circumferentially continuous loops, one of said loops haivng an inner peripheral extent so that said loop is capable of encircling a container and grippingly engaging the outer circumferential surface of said container, and another of said loops being shaped to form a handle for transporting said carrier, and the interconnection of said loops being formed by a welding of said cord-like material.*

References Cited

The following references, cited by the Examiner, are of record in the patented file of this patent or the original patent.

UNITED STATES PATENTS

| | | | |
|---|---|---|---|
| 1,688,888 | 10/1928 | Spreen | 220—23.4 |
| 2,856,069 | 10/1958 | Felber | 206—65 D |
| 2,994,426 | 8/1961 | Biesecker et al. | 206—65 C |
| 3,097,746 | 7/1963 | Poupitch | 206—65 |

WILLIAM T. DIXSON, JR., Primary Examiner

U.S. Cl. X.R.

220—23.4, 116; 294—87.2